US010683108B2

(12) United States Patent
Lim et al.

(10) Patent No.: US 10,683,108 B2
(45) Date of Patent: Jun. 16, 2020

(54) RIDESHARE ADAPTER, A CONFIGURABLE-MASS, DISTRIBUTED ARCHITECTURE RIDESHARE DISPENSER FOR A RIDESHARE ADAPTER, AND A METHOD OF OPERATING THE RIDESHARE DISPENSER

(71) Applicant: TriSept Corporation, Chantilly, VA (US)

(72) Inventors: Daniel Lim, Chantilly, VA (US); Jason Armstrong, Chantilly, VA (US); Robert Spicer, Chantilly, VA (US)

(73) Assignee: TriSept Corporation, Chantilly, VA (US)

( * ) Notice: Subject to any disclaimer, the term of this patent is extended or adjusted under 35 U.S.C. 154(b) by 381 days.

(21) Appl. No.: 15/651,956

(22) Filed: Jul. 17, 2017

(65) Prior Publication Data
US 2017/0327252 A1 Nov. 16, 2017

Related U.S. Application Data

(62) Division of application No. 14/044,066, filed on Oct. 2, 2013, now Pat. No. 9,718,565.

(60) Provisional application No. 61/709,412, filed on Oct. 4, 2012.

(51) Int. Cl.
*B64G 1/64* (2006.01)
*B64G 1/00* (2006.01)
*B64G 1/10* (2006.01)

(52) U.S. Cl.
CPC .............. *B64G 1/641* (2013.01); *B64G 1/002* (2013.01); *B64G 2001/1092* (2013.01); *B64G 2001/643* (2013.01)

(58) Field of Classification Search
CPC .. B64D 1/12; B64G 2001/1092; B64G 1/002; B64G 1/64; B64G 1/645; B64G 1/641; B64G 2001/643
See application file for complete search history.

(56) References Cited

U.S. PATENT DOCUMENTS

| 4,298,178 A | * | 11/1981 | Hujsak | B64G 1/1078 244/172.5 |
| 5,050,821 A | * | 9/1991 | Kerstein | B64G 1/14 244/158.1 |
| 5,271,582 A | * | 12/1993 | Perkins | B64G 1/22 244/159.4 |

(Continued)

OTHER PUBLICATIONS

Maly, Joseph R., et al.; "Adapter Ring for Small Satellites on Responsive Launch Vehicles"; 7th Responsive Space Conference, Apr. 27-30, 2009, Los Angeles California; AIAA; RS7-2009-1006, 10 pgs.

(Continued)

Primary Examiner — Valentina Xavier

(57) ABSTRACT

A rideshare adapter for a launch vehicle (LV), a configurable-mass rideshare dispenser for a rideshare adapter employable with a LV, and a method of operating a configurable-mass rideshare dispenser for an LV are disclosed herein. In one embodiment, the rideshare adapter includes: (1) an annular peripheral wall that defines an interior of the rideshare adapter and (2) inner support walls, mechanically coupled to the peripheral wall, that are located within the interior and divide the interior into multiple rideshare dispenser compartments.

7 Claims, 13 Drawing Sheets

(56) References Cited

U.S. PATENT DOCUMENTS

| | | | | |
|---|---|---|---|---|
| 5,314,146 A * | 5/1994 | Chicoine | ............... | B64G 1/10 |
| | | | | 244/159.4 |
| 5,518,209 A * | 5/1996 | Chicoine | ............... | B64G 1/10 |
| | | | | 244/159.4 |
| 2012/0012711 A1* | 1/2012 | Ross | ............... | B64G 1/641 |
| | | | | 244/158.2 |
| 2014/0131521 A1 | 5/2014 | Apland et al. | | |
| 2015/0028159 A1 | 1/2015 | Vichnin et al. | | |

OTHER PUBLICATIONS

Pawlikowski, E., et al.; "Space Disruptive Challenges, New Opportunities, and new Strategies"; Strategic Studies Quarterly, Spring 2012; 28 pgs.

* cited by examiner

RIDESHARE ADAPTER, A CONFIGURABLE-MASS, DISTRIBUTED ARCHITECTURE RIDESHARE DISPENSER FOR A RIDESHARE ADAPTER, AND A METHOD OF OPERATING THE RIDESHARE DISPENSER

CROSS-REFERENCE TO RELATED APPLICATION

This Application is a Divisional of U.S. application Ser. No. 14/044,066 filed on Oct. 2, 2013, to Daniel Lim, et al., entitled "CONFIGURABLE-MASS, DISTRIBUTED ARCHITECTURE RIDESHARE DISPENSER FOR LAUNCH VEHICLE AND METHOD OF OPERATION THEREOF" currently pending, which claims the benefit of U.S. Provisional Application Ser. No. 61/709,412, filed by Lim, et al., on Oct. 4, 2012, entitled "FANTM-RiDE System," these applications commonly assigned with this application and incorporated herein by reference in their entirety.

TECHNICAL FIELD

This application is directed, in general, to satellite launch systems and, more specifically, to dispensing rideshare satellites from a launch system.

BACKGROUND

In light of the US space industry's recent refocus on disaggregation mission areas of behemoth, highly complex, large cost, and subsequently, risk adverse space systems, much attention has been placed on the option of employing smaller payloads to realize the vision of increased system and mission resiliency, reduction of cost, and an increase of launch opportunities. The practice of launching multiple independent payloads into space on a single launch vehicle (LV) is called "rideshare." Rideshare can occur when an LV scheduled to carry a primary payload has excess lift capacity available for auxiliary payloads. Spacecraft that use rideshare are referred to as auxiliary payloads (APLs), secondary payloads, or tertiary payloads. Rideshare does not require a primary payload, however. "Dedicated rideshare" occurs when the entire manifest of an LV consists of small satellite ("smallsat") payloads that would not typically justify their own launch vehicle due to their size or importance. Rideshare is complex because of the large amount of coordination, technical and programmatic task execution, and analyses required to integrate all of the rideshare payloads on a mission without perturbing LV or space vehicle (SV) mission requirements. The US space industry has taken a particularly dim view of rideshare not only because of the complexity of mission integration, but also a large perceived risk to the LV and primary SV providers, a lack of viable launch opportunities and a launch price point that is higher than the current rideshare user market is willing to bear.

SUMMARY

In one aspect the disclosure provides a rideshare adapter for a LV. In one embodiment, the rideshare adapter includes: (1) an annular peripheral wall that defines an interior of the rideshare adapter and (2) inner support walls, mechanically coupled to the peripheral wall, that are located within the interior and divide the interior into multiple rideshare dispenser compartments.

In another aspect the disclosure provides a configurable-mass rideshare dispenser for a rideshare adapter employable with a LV. In one embodiment, the configurable-mass rideshare dispenser includes: (1) a modular chassis having a plurality of walls, wherein each of the plurality of walls includes multiple internal mounts operable to mount at multiple candidate locations a rideshare payload, its associated attachment/deployment mechanisms, signal processing circuitry, and at least one additional mass object, and (2) at least one door coupled to at least one of the plurality of walls, wherein the signal processing circuitry is operable to provide deployment sequencing that operates the at least one door.

In yet another aspect, the disclosure provides a method of operating a configurable-mass rideshare dispenser for an LV. In one embodiment, the method includes: (1) mounting, in a modular chassis having an LV mount configured to mount the modular chassis to the LV and an LV interface configured to receive a separation signal from the LV, a rideshare payload at a selected one of multiple candidate locations in the modular chassis, (2) mounting payload signal processing circuitry operable to provide deployment sequencing for the rideshare payload at another selected one of the multiple candidate locations in the modular chassis, (3) determining whether at least one additional mass object should also be mounted in the modular chassis to achieve a desired mass and center of gravity for the dispenser, (4) mounting the at least one additional mass object in the modular chassis if the at least one additional mass object should also be mounted in the modular chassis and (5) mounting the modular chassis onto a launch vehicle.

BRIEF DESCRIPTION

Reference is now made to the following descriptions taken in conjunction with the accompanying drawings, in which.

DETAILED DESCRIPTION

Figure 1:
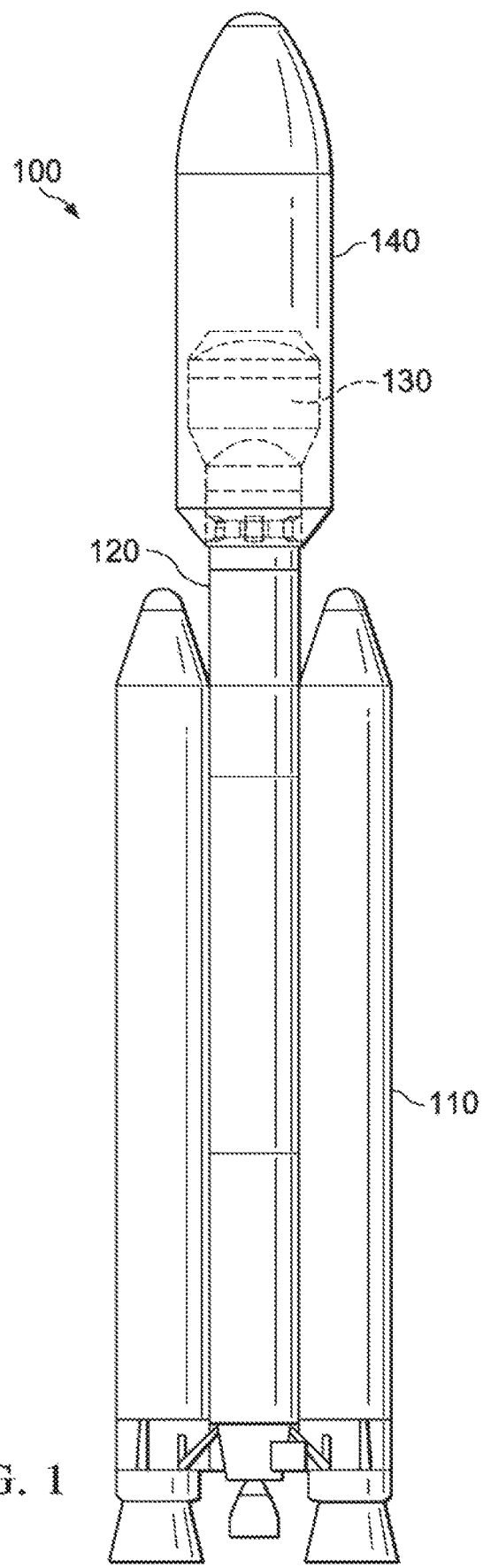
FIG. 1 is an elevational view of one embodiment of an LV that may be employed to launch various embodiments of the configurable-mass rideshare dispenser introduced herein.

The global economic downturn that began in 2007 sent a subsequent wave of impact against the US government (USG) civil and defense budgets. This fiscally challenging environment has renewed USG interest in finding more affordable methods to deploying scientific, experimental, and defense payloads on orbit.

Consequently, the US space industry has shifted focus on the disaggregation of large, multi-mission satellite systems to smaller, "distributed architectures" to increase resiliency of national assets and decrease overall industry costs to deploy satellites to orbit. A study by the Air Force Space and Missile Systems Center (SMC) states, "we conclude the best means available to affordably provide resilient space capabilities the war fighter can depend upon and adapt as mission needs evolve is to use a distributed architecture strategy coupled with a rideshare payload-focused acquisition strategy" (Pawlikowski, et al., "Disruptive Challenges, New Opportunities, and New Strategies," Strategic Studies Quarterly, Spring (2012), pp. 40-41, 50-51) Similar sentiments have arisen across the rest of the industry, as decision-makers have identified the need to transform the current acquisition methods to lower costs and increase system resiliency. Subsequently, the USG has increased examination of possible solutions to facilitate disaggregation, such as government-hosted payloads (HPs) on commercial satellites and ridesharing of government spacecraft on manifested and forecasted missions. This is evidenced in the latest US national space policy. Unfortunately, conventional HP and ridesharing approaches have been found wanting.

Introduced herein are various embodiments of a configurable-mass rideshare dispenser for an LV and a method of operating the same. In certain embodiments, the dispenser and method effect a distributed architecture capable of supporting rideshare of APLs, including dedicated rideshare.

In general, the dispenser includes a modular chassis having an LV mount configured to mount the modular chassis to the LV and an LV interface configured to receive a separation signal from the LV. Each rideshare dispenser is designed to possess independent batteries, separation signal sequencer, telemetry, and other hardware to support APLs, to include an on-board video system or communications, as required. The dispenser further includes multiple internal mounts associated with the chassis and operable to mount at multiple candidate locations therein at least one rideshare payload and its associated attachment/deployment mechanisms, signal processing circuitry operable to provide deployment sequencing and commodities for the rideshare payload and at least one additional mass object, as required.

In general, the method involves a modular chassis having an LV mount configured to mount the modular chassis to the LV and an LV interface configured to receive a separation signal from the LV. The method includes mounting at least one rideshare payload and its associated attachment/deployment mechanisms, signal processing circuitry operable to provide deployment sequencing for the rideshare payload at selected ones of multiple candidate locations in the modular chassis. The method further includes determining whether at least one additional mass object should also be mounted in the modular chassis to achieve a desired mass and center of gravity for the dispenser, if so, mounting the at least one additional mass object in the chassis if the at least one additional mass object should also be mounted in the modular chassis.

The dispenser takes the form of a modular chassis that "genericizes" the rideshare payload it contains not only in terms of the power and signals the rideshare payload requires from the LV, but also the volume, mass and center of gravity of the rideshare payload it contains. The dispenser represents a "generic" rideshare payload to the LV that requires from the LV only a standard, rudimentary separation signal; the dispenser accommodates any adaptations necessary to conform the mass and center of gravity to a uniform standard and the details of managing and deploying the specific rideshare payload(s) it contains.

The dimensions of the modular chassis determine the volume of the dispenser. Power, telemetry and signal processing circuitry and the rideshare payload in the dispenser may be mounted in the dispenser to make its center of gravity as close to optimum as possible. If necessary, one or more additional mass objects (e.g., non-deploying payloads or ballast mass objects) may also be mounted in the dispenser to increase the mass and move the center of gravity of the dispenser to bring them to within standard limits.

The result of this "genericizing" is that rideshare payload design and deployment may be "decoupled" from "mission integration flow" of the other spacecraft in the manifest, namely the timeline and processes involved in integrating payloads onto the LV for launch.

One significant advantage of this "genericizing" and resulting "decoupling" is that the combined payload(s) contained in each dispenser will require only one coupled loads analysis (CLA) because the mass properties of the dispenser will be brought to conform to the single CLA (i.e., "mass tuned"). As those skilled in the pertinent art are aware, CLA is a type of finite-element analysis, specifically a structural response analysis, often employing multiple dynamic models to estimate the coupled response of an LV and SV to forces generated during the launch, flight and stage separation required to place the SV into orbit. CLA is a critical process for minimizing risk and maximizing the probability of mission success. However, CLA is complex and must be repeated every time the mass or center of gravity of the load materially changes. Reducing the number of times CLA has to be performed (ideally to one) saves significant effort, time and money, ultimately reducing risk to the LV and other SV providers.

An example is in order. Conventionally, the small satellite providers that originate rideshare payloads must usually reserve space on a scheduled launch two to four years in advance, which is often an unacceptably long lead-time for smallsat developers. Then the providers must finalize their rideshare payload designs soon afterwards so that a CLA may be performed. Over time, the rideshare payloads inevitably undergo design changes, many necessitating additional CLAs for the mission. With the benefit of the teachings herein, a rideshare launch can be scheduled far in advance of APL development, and CLA may be performed early using the generic loads presented by the novel dispensers. At any time (in theory up to days before launch), a small satellite provider can reserve and occupy an unallocated dispenser without affecting the CLA. Conversely, if necessary, an APL provider may elect to opt out of a launch manifest late in the mission timeline without affecting the overall mission, for example, in the case that an APL provider desires more time for investigation of an anomaly during APL development. As long as the dispenser's mass and center of gravity stay within limits assumed for purposes of conducting the CLA, the validity of the CLA remains intact. These limits within which the CLA remains valid will be termed, "standard limits," herein.

While this example regards advantages stemming from simplified CLA, those skilled in the pertinent art will realize that the distributed architecture brought about by the novel module's independent separation signal processing circuitry, telemetry, batteries, and other APL commodities further simplify integration of rideshare payloads with the LV by narrowing down the electrical needs of the rideshare payloads to a separation signal from the LV. One practical example of the consequence of this flexibility is that a loaded dispenser can be quickly removed from one LV and integrated onto a different LV in the event of launch delay due to SV processing delays or grounding of an LV fleet due to a launch anomaly.

FIG. 1 is an elevational view of one embodiment of an LV 100 that may be employed to launch various embodiments of the rideshare dispenser introduced herein. The LV 100 includes at least one booster 110 that provides steerable thrust to launch the LV 100. A fuselage 120 transmits the thrust to one or more payloads 130 enclosed within a fairing 140, which provides an aerodynamic cover for the one or more payloads 130. The fairing 140 detaches from the LV 100 at a certain point in its mission, exposing the one or more payloads 130 prior to deployment of one or more payloads 130.

Figure 2B:
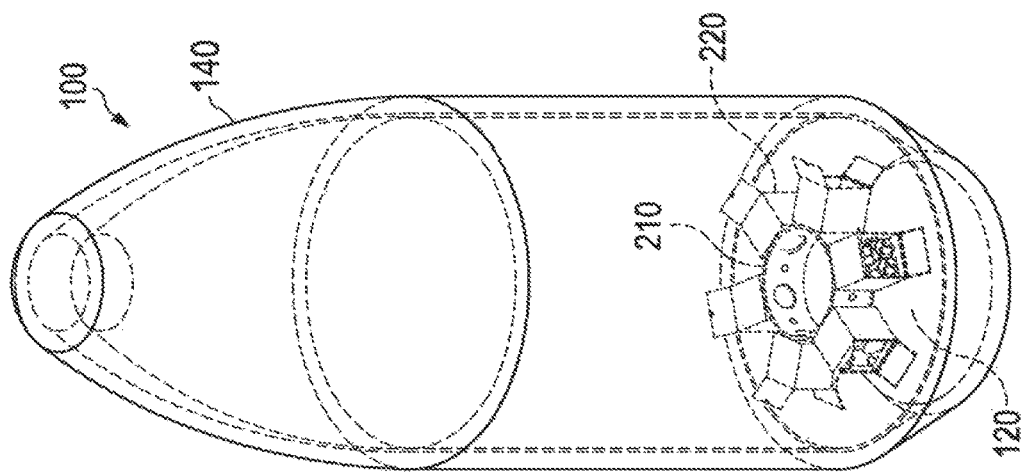
FIGS. 2A and 2B are respective elevational and isometric views of a portion of the LV of FIG. 1 illustrating in particular one embodiment of a configurable-mass rideshare dispenser.
Figure 2A:
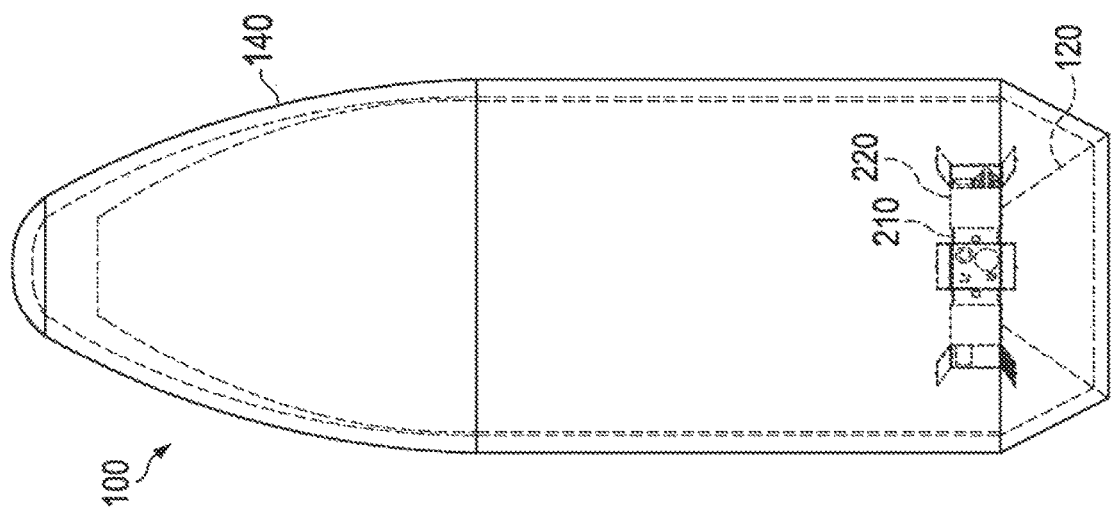

FIGS. 2A and 2B are respective elevational and isometric views of a portion of the LV 100 of FIG. 1 illustrating in particular one embodiment of a configurable-mass rideshare dispenser. Referring jointly to FIGS. 2A and 2B, enclosed within the fairing 140 is an upper portion of the fuselage 120. A rideshare adapter 210 is coupled to the fuselage 120 on which are mounted at least one dispenser 220 constructed according to the principles of the present invention.

Alternative embodiments of the LV 100 may have bulkheads or other structures on which one or more dispenser 220 may be mounted. Thus, the scope of the invention disclosed herein is not limited by a particular place or manner in which a dispenser may be mounted to an LV 100. To keep this disclosure of reasonable length, only some mounting embodiments will be described, specifically those involving mounting on or in a rideshare adapter. One embodiment is shown in FIGS. 2A and 2B in which the at least one dispenser 220 is mounted on, and projects radially outwardly from, the generally annular peripheral wall of an adapter ring. Another embodiment provides apertures in its generally annular peripheral wall, allowing at least one dispenser to be mounted in its interior. This latter embodiment will now be described.

Figure 3:
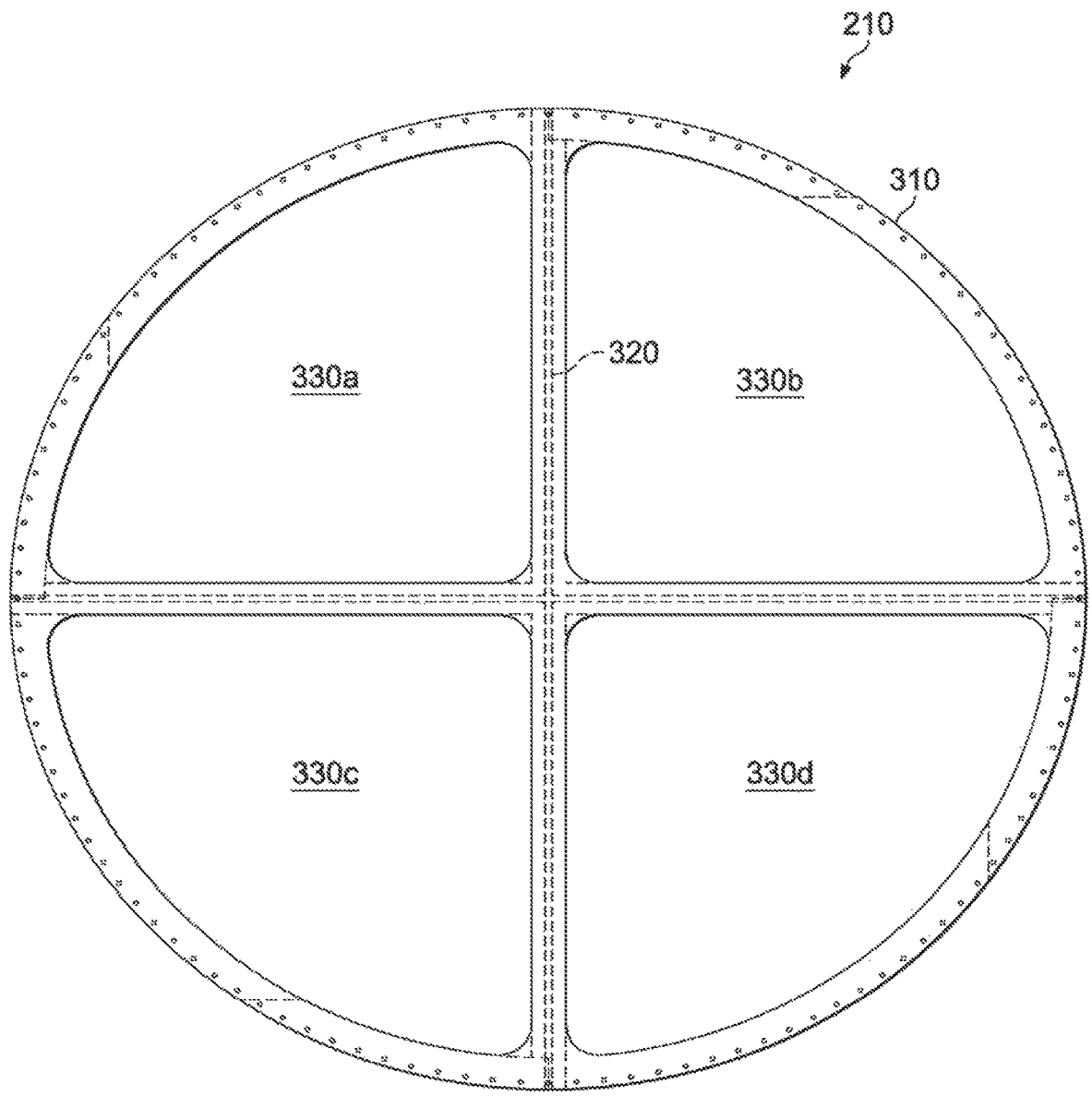
FIG. 3 is a plan view of one embodiment of a rideshare adapter for one embodiment of a configurable-mass rideshare dispenser.

FIG. 3 is a plan view of one embodiment of the rideshare adapter 210. The adapter 210 includes a generally annular peripheral wall 310 that defines an adapter interior (unreferenced) and inner support walls 320 coupled to the generally annular peripheral wall 310 and lying in the interior. The inner support walls 320 divide the interior into multiple dispenser compartments. In the illustrated embodiment, the inner support walls 320 divide the interior into four dispenser compartments 330a, 330b, 330c, 330d. Shown but not referenced are holes along the generally annular peripheral wall 310 that facilitate mounting of the generally annular peripheral wall 310 to other portions of the fuselage (e.g., the fuselage 120 of FIGS. 1, 2A and 2B). The inner support walls 320 assist the generally annular peripheral wall 310 in providing structural strength and stiffness to the adapter 210, which is often vital given the magnitude of axial and lateral forces that bear on a fuselage during its flight.

Figure 4:
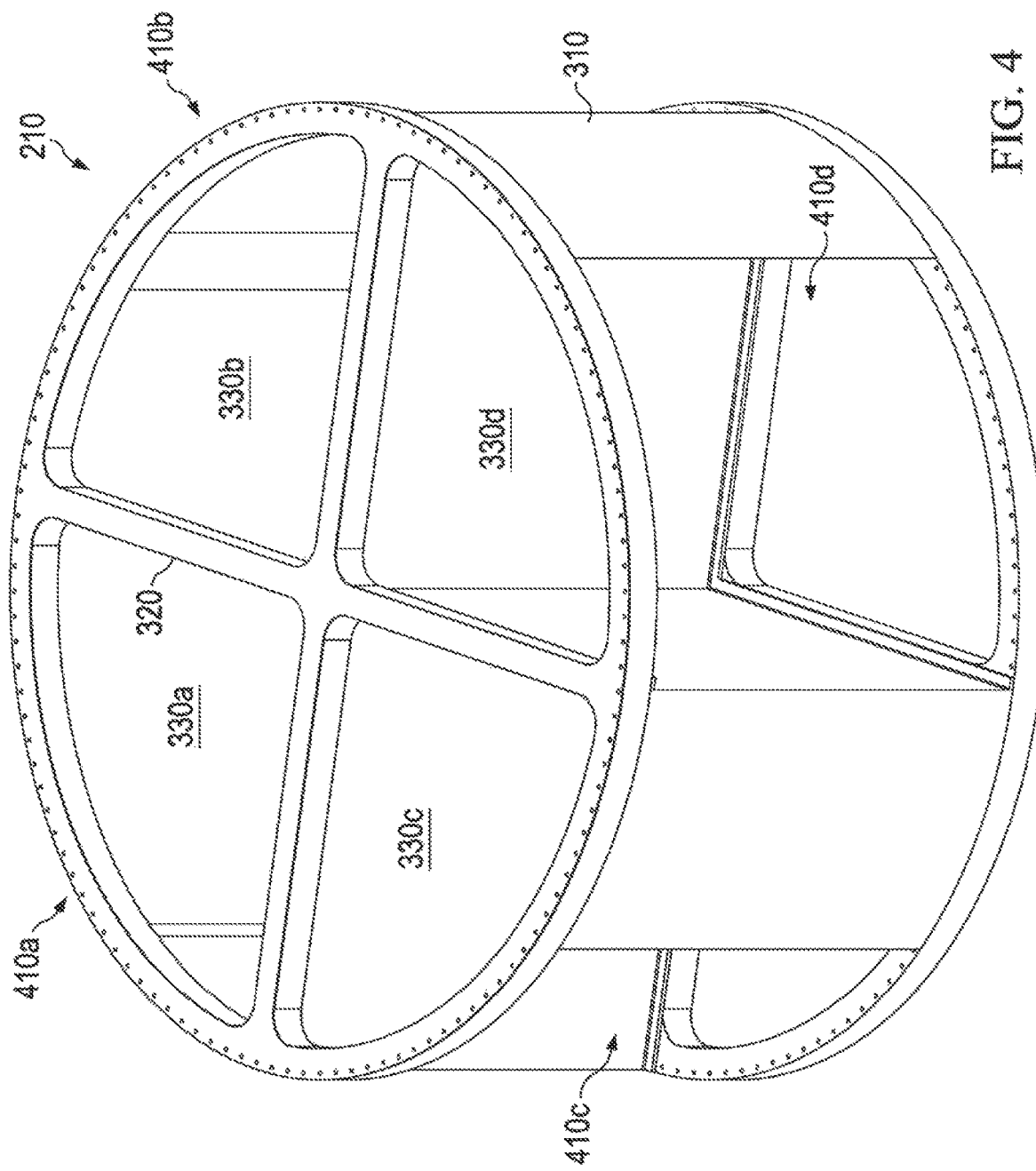
FIG. 4 is an isometric view of the rideshare adapter of FIG. 3.

FIG. 4 is an isometric view of the adapter 210 of FIG. 3. FIG. 4 is presented primarily for the purpose of showing of showing apertures 410a, 410b, 410c, 410d in the generally annular peripheral wall 310. Assuming the adapter 210 forms part of an enclosed fuselage, apertures 410a, 410b, 410c, 410d provide external access to their corresponding dispenser compartments 330a, 330b, 330c, 330d. Dispensers may now be mounted in the dispenser compartments 330a, 330b, 330c, 330d, as will now be illustrated.

Figure 5:
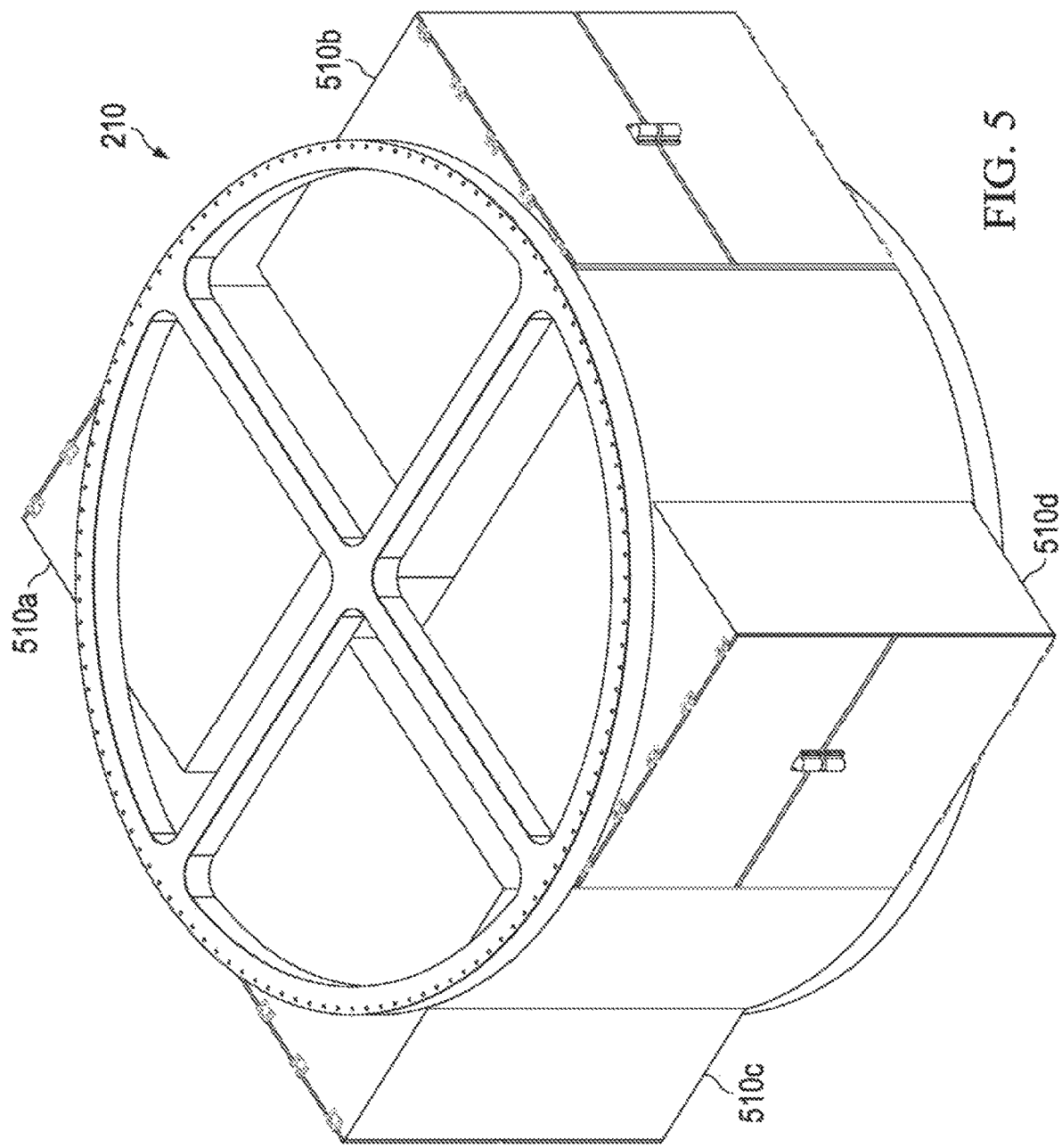
FIG. 5 is an isometric view of one embodiment of the adapter of FIGS. 3 and 4 together with a plurality of configurable-mass rideshare dispenser embodiments.

FIG. 5 is an isometric view of one embodiment of the adapter 210 of FIGS. 3 and 4 together with a plurality of rideshare dispenser embodiments 510a, 510b, 510c, 510d. The illustrated embodiments of the dispensers 510a, 510b, 510c, 510d has a generally cubical modular chassis (unreferenced) made of walls with at least one door forming a face of each dispenser 510a, 510b, 510c, 510d. As is evident in FIG. 5, the dispensers 510a, 510b, 510c, 510d occupy a substantial portion of their corresponding dispenser compartments 330a, 330b, 330c, 330d. In other embodiments, the rideshare dispensers 510a, 510b, 510c, 510d are other than cubic, perhaps elongated in one dimension to make them a right rectangular prism or having one or more nonplanar surfaces such that they are three-dimensional polygons. The invention is not limited to a dispenser of any particular shape, and dispensers of varying shape and size may coexist on the same LV. In various embodiments, the rideshare dispensers can further provide vibration isolation (e.g., by a vibration-absorbing LV mount or the judicious placement of mass within the rideshare dispensers). In various other embodiments, the rideshare dispensers can provide electromagnetic isolation as well by employing metal or metal-impregnated composite walls for the construction of their modular chassis.

Figure 6:
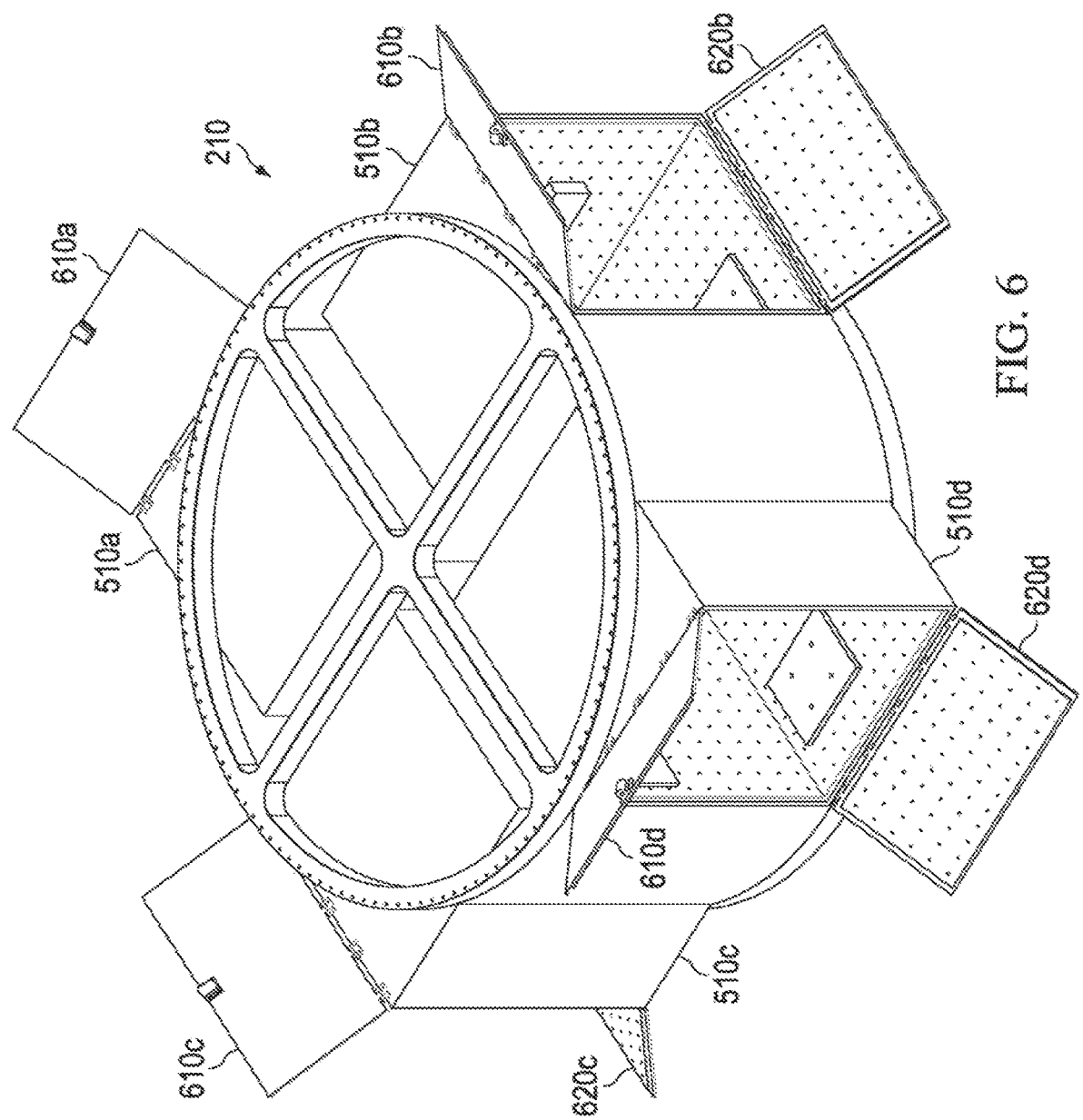
FIG. 6 is an isometric view of the adapter and rideshare dispensers of FIG. 4 in which the rideshare dispensers are open.

FIG. 6 is an isometric view of the adapter ring 210 and rideshare dispensers 510a, 510b, 510c, 510d of FIG. 4 in which the rideshare dispensers 510a, 510b, 510c, 510d are open. FIG. 6 is presented primarily for the purpose of illustrating that each of the rideshare dispensers 510a, 510b, 510c, 510d has at least one door that may be opened to expose any payload or payloads that are contained within each of the rideshare dispensers 510a, 510b, 510c, 510d. In the specific embodiment of FIG. 6, each of the rideshare dispensers 510a, 510b, 510c, 510d has two doors, hinged as shown. Several of the doors are shown and reference. For example, one door of the rideshare dispenser 510a is shown and referenced as 610a. The rideshare dispenser 510b has two doors 610b, 620b; the rideshare dispenser 510c has two doors 610c, 620c; and the rideshare dispenser 510d has two doors 610d, 620d.

Figure 7:
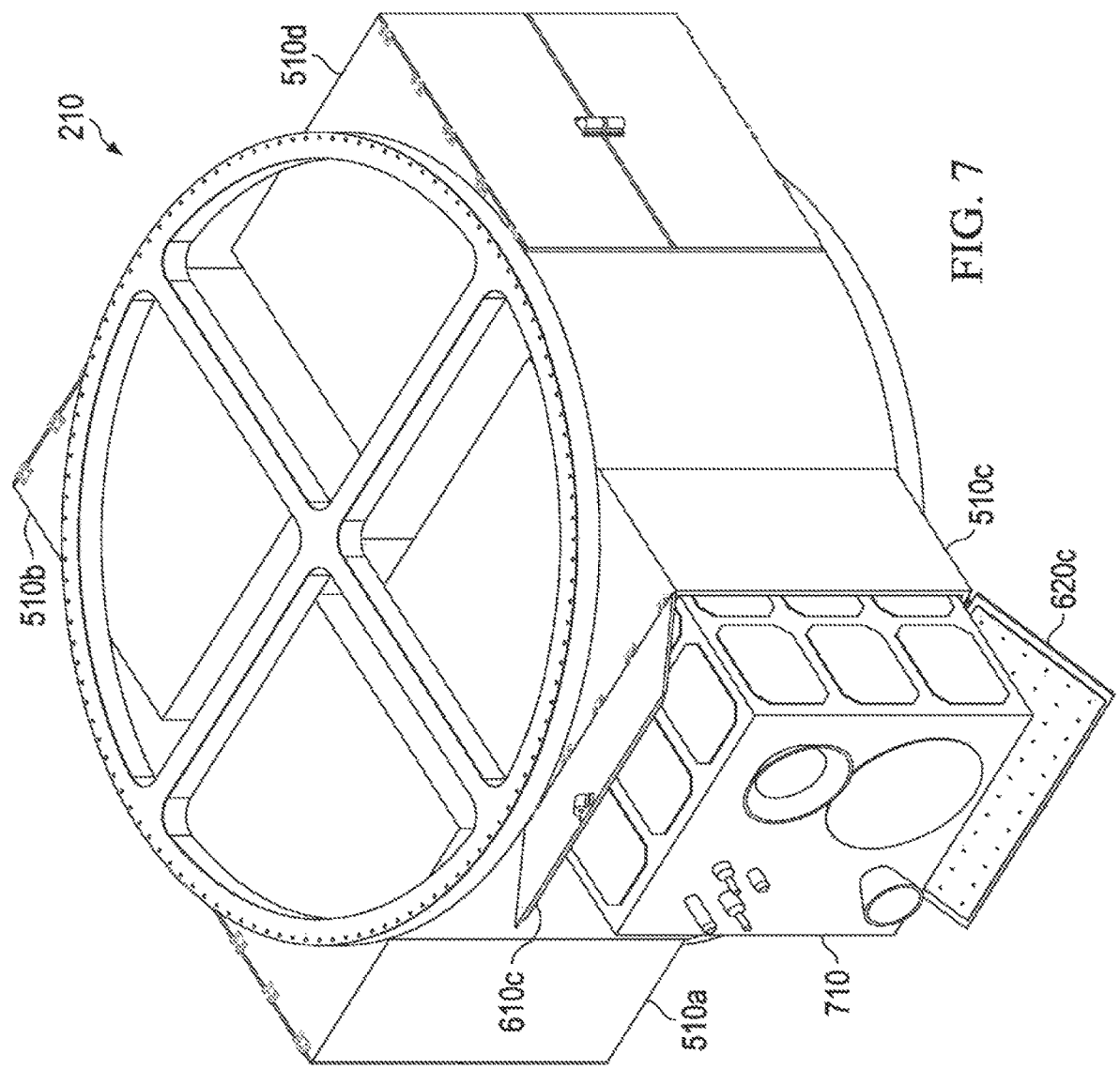
FIG. 7 is an isometric view of the adapter and rideshare dispensers of FIG. 4 in which one of the rideshare dispensers is open and occupied by one or more rideshare payloads and signal processing circuitry.

FIG. 7 is an isometric view of the adapter 210 and rideshare dispensers 510a, 510b, 510c, 510d of FIG. 4 in which one of the rideshare dispensers 510a, 510b, 510c, 510d is open and occupied by one or more rideshare payloads 710 and signal processing circuitry (unreferenced). In one embodiment, the dimensions of the one or more rideshare payloads and signal processing circuitry fit within a volume of about 24 inches in each direction, for a total of about 13,824 cubic inches. At such size, the rideshare dispenser is operable to enclose smallsat payloads that range from the industry-standard 1 unit (U) Cubesat (i.e. a 10 cm-sided cube and about 1.33 kgs) to almost the size of an Evolved Expendable Launch Vehicle (EELV) Secondary Payload Adapter (ESPA)-class smallsat. Those skilled in the pertinent art will be aware that other shapes and volumes fall within the scope of the invention.

Figure 8:
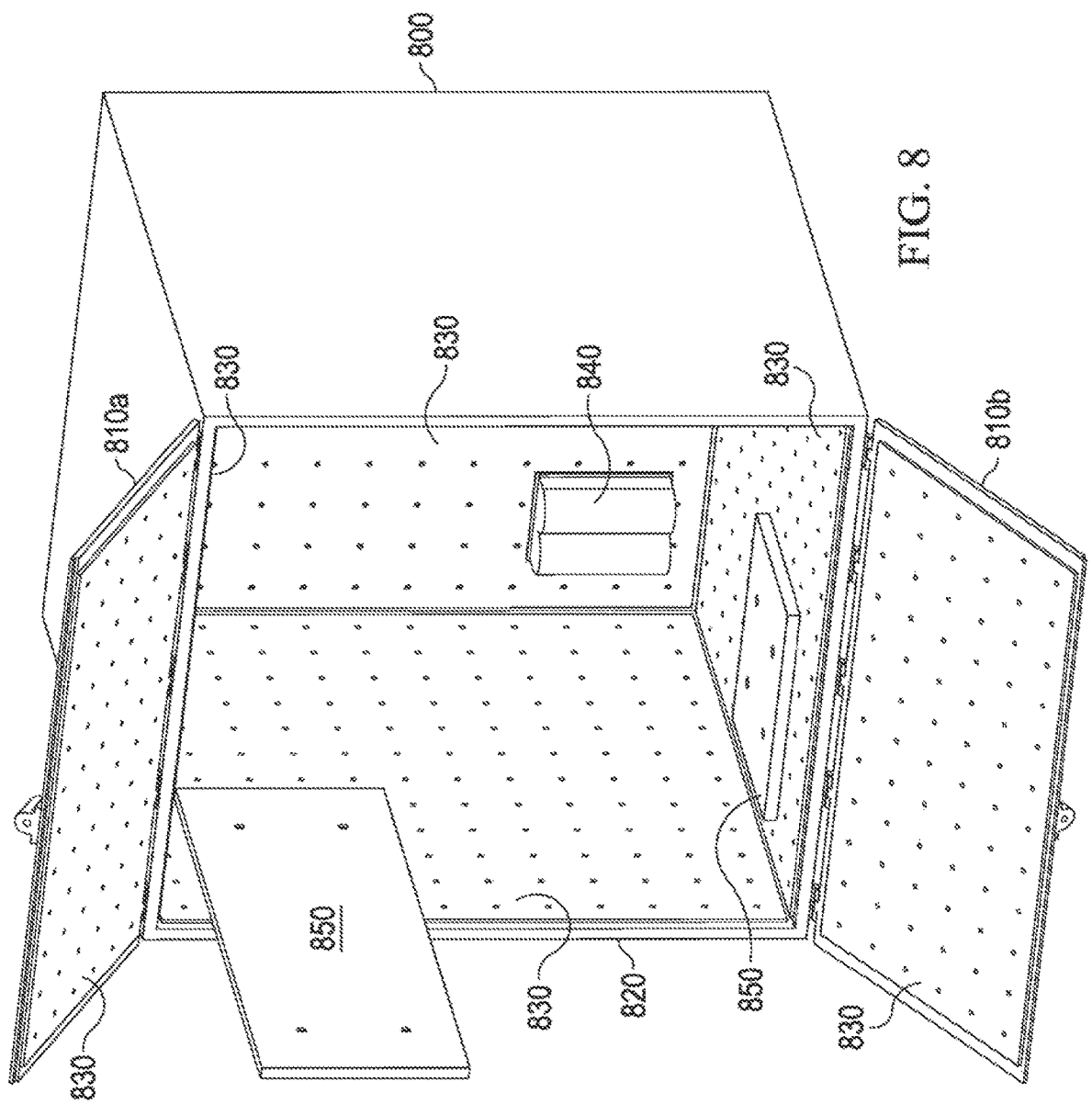
FIG. 8 is an isometric view of one embodiment of an interior of one embodiment of a configurable-mass rideshare dispenser.

FIG. 8 is an isometric view of one embodiment of an interior of one embodiment of a configurable-mass rideshare dispenser 800. The illustrated embodiment of the rideshare dispenser 800 takes the form of an enclosed box having walls (one of which being referenced as 820) and first and second doors 810a, 810b. As oriented in FIG. 8, the first and second doors 810a, 810b are upper and lower doors of at least approximately the same size. However, the first and second doors 810a, 810b may be side-by-side. In alternative embodiments, the first and second doors 810a, 810b are of different size. In further alternative embodiments, the rideshare dispenser 800 has only a single door. In still further alternative embodiments, the rideshare dispenser 800 has more than two doors.

Illustrated within the rideshare dispenser 800 is at least one "pegboard" panel plate 830 associated attached to a wall (e.g., the wall 820) of the rideshare dispenser 800, which has a plurality of holes. The holes provide mounts at multiple candidate locations in the rideshare dispenser 800. APLs (unreferenced in FIG. 8) and their associated signal processing circuitry hardware 840 may be attached to the pegboards through the holes in the panel, conceivably with through bolts, screws, or helicoils. The holes in the pegboard panel plate may also be employed to route and/or secure electrical harness wires to keen them secure during launch and deployment. In the specific embodiment of FIG. 8, pegboard panels 830 are associated with each of the walls of the rideshare dispenser 800, including the doors. Other embodiments of the rideshare dispenser 800 have different numbers of pegboard panels on each wall, and some walls may have no pegboard panels whatsoever. In the embodiment of FIG. 8, each of the doors 810a, 810b has a pegboard panel 830 as well.

FIG. 8 shows two ballast mass objects 850 affixed to the pegboard panels. One is shown as being only partially inserted into the dispenser 800, to be attached to the pegboard panel 830, and the other one is shown fully inserted into its corresponding pegboard panel location. In the embodiment of FIG. 8, the ballast mass objects 850 take the form of ballast mass plates, which are predominantly planar. The ballast mass objects 850 (e.g., the ballast mass plates) accordingly have corresponding features (e.g., attachment holes or bosses) that allow fasteners (e.g., bolts, screws, etc.) to attach each ballast mass object 850 to their corresponding pegboard panel 830. Those skilled in the pertinent art will understand that many features may be used to restrain ballast mass objects. All such features fall within the scope of the invention. In other embodiments, such features allow ballast mass objects to be coupled to one or more walls of the rideshare dispenser 800 through slots or other means of attaching all contents of the dispenser.

Those skilled in the art will understand that, given the ability to place additional mass objects (e.g., non-deploying payloads or ballast mass objects) at various positions in the rideshare dispenser, the overall mass and center of gravity can be tuned to increase the mass and adjust for any deviations in center of gravity brought about by placement of the rideshare payload and signal processing circuitry within the rideshare dispenser 800 to bring the mass and center of gravity to within standard limits.

For example, standard limits (assumed for purposes of conducting an existing CLA) may call for the mass of the rideshare dispenser to be between 230 and 240 lbs kg and the center of gravity to lie within a 10 cm by 10 cm by 10 cm cube located 10 cm from the geometric center of the rideshare dispenser 800 toward its LV mount. Accordingly, if the rideshare payload and signal processing circuitry have a mass of 216 lbs, and placing them as best as possible within the rideshare dispenser results in a center of gravity that is 6.8 cm in the Y-direction of a predetermined coordinate system within the dispenser from the 10 cm by 10 cm by 10 cm cube, it is apparent that between 14 and 24 lbs of additional, non-deploying payload or ballast mass should be added to the rideshare dispenser 800, and located such that the center of gravity is brought to within the 10 cm by 10 cm by 10 cm cube.

The features, e.g., the pegboard panels, in the above-described embodiment further serve as internal mounts, allowing the rideshare payload and signal processing circuitry to be mounted within the rideshare dispenser 800. Another embodiment will now be described in which the rideshare dispenser and internal mounts take a different form.

Figure 9:
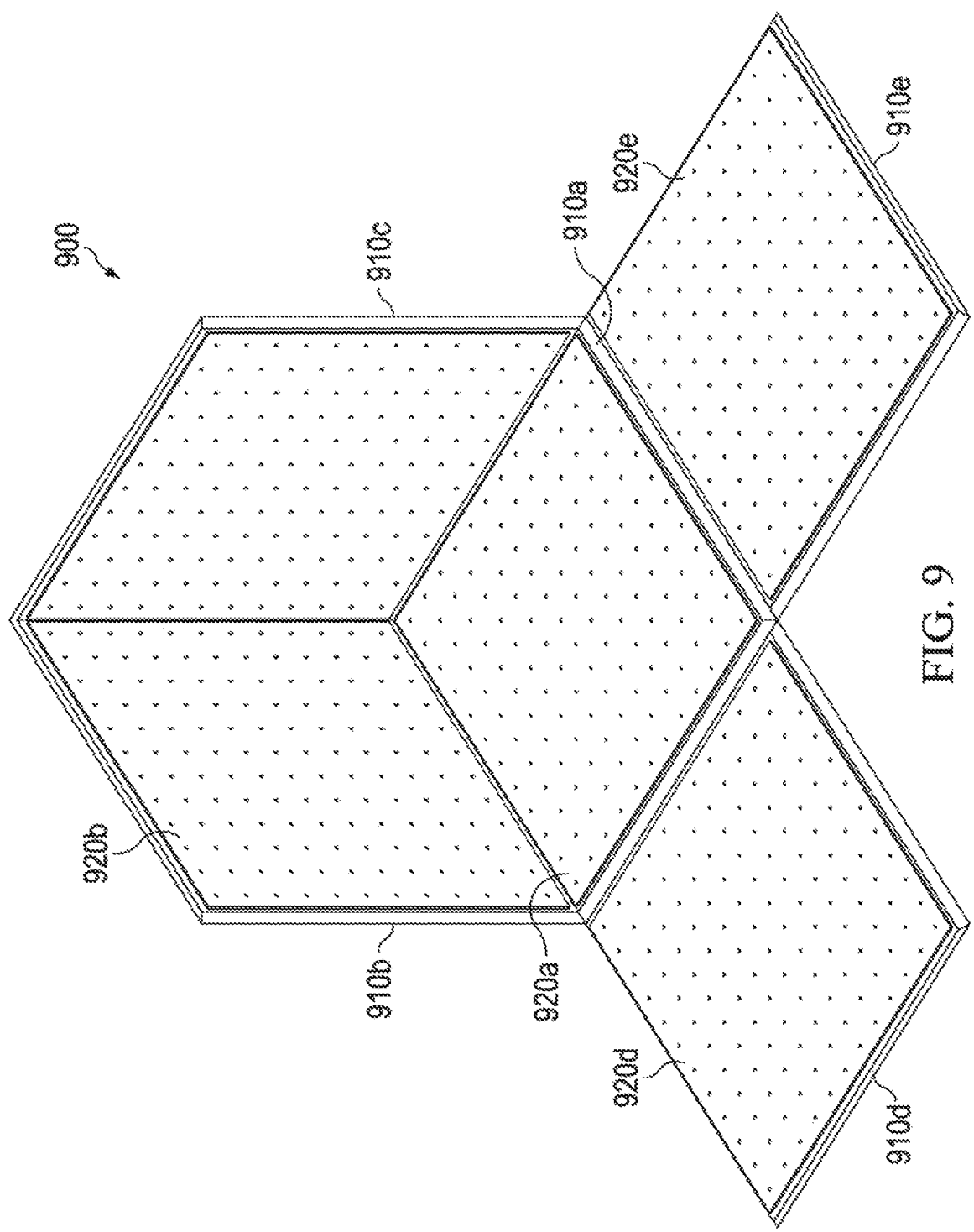
FIG. 9 is an isometric view of one embodiment of a configurable-mass rideshare dispenser in which walls thereof are laid open.

FIG. 9 is an isometric view of one embodiment of a configurable-mass rideshare dispenser 900. In the embodiment of FIG. 9, walls of the rideshare dispenser 900 are hingedly coupled to one another and shown laid open for clarity. This configuration allows for easy access to panels during dispenser 900 loading of APLs and associated hardware. Specifically, FIG. 9 shows a rear wall 910a having internal mounts (e.g., pegboard panels) 920a. Side walls 910a, 910d, 910e likewise have corresponding internal mounts 920a, 920d, 920e. Each of the internal mounts 920a, 920d, 920e has a plurality of holes by which payloads, signal processing circuitry and, as needed, additional payload or ballast mass objects (not shown) may be mounted to the internal mounts 920a, 920d, 920e An LV mount (occluded from view in FIG. 9) is coupled to the rear wall 910a. The rear wall 910a is hingedly coupled to the side walls 910b, 910c, 910d, 910e, while the side walls 910b, 910c, 910d, 910e are releasedly coupled to each other so they can be laid open to expose a rideshare payload within the rideshare dispenser 900. FIG. 9 does not show any doors or a top wall, but such would be coupled to at least one of the side walls 910b, 910c, 910d, 910e were such to be shown.

Figure 10:
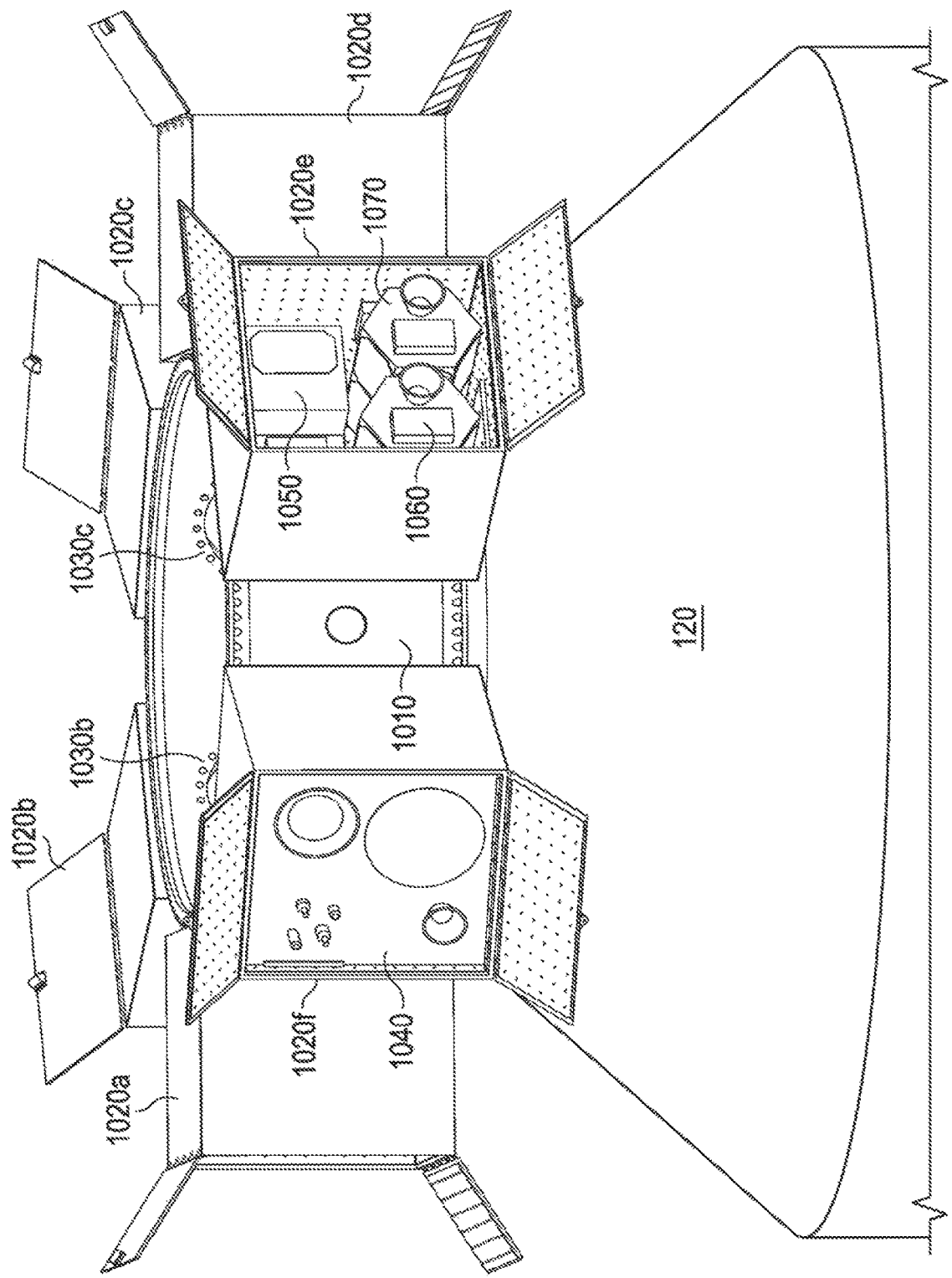
FIG. 10 is an isometric view of another embodiment of an adapter together with a plurality of configurable-mass rideshare dispensers.

FIG. 10 is an isometric view of another embodiment of an adapter ring 1010 (specifically a variety of ESPA ring) connected to a fuselage 120 of an LV (not shown), together with a plurality of configurable-mass rideshare dispensers 1020a, 1020b, 1020c, 1020d, 1020e, 1020f attached to a periphery of the adapter ring 1010. Two mounts for the rideshare dispensers 1020a, 1020b, 1020c, 1020d, 1020e, 1020f to the adapter ring 1010 are shown, namely: a mount 1030b for the rideshare dispenser 1020b and a mount 1030c for the rideshare dispenser 1020c. Doors (unreferenced) associated with the various rideshare dispensers 1020a, 1020b, 1020c, 1020d, 1020e, 1020f are shown in their open position, implying that various payloads are in the process of being deployed.

Payloads in two of the rideshare dispensers 1020a, 1020b, 1020c, 1020d, 1020e, 1020f, namely the rideshare dispensers 1020f, 1020e are shown: a rideshare payload 1040 in the rideshare dispenser 1020f and payloads 1060, 1070 in the rideshare dispenser 1020e. Signal processing circuitry 1050 is also shown in the rideshare dispenser 1020e. Signal processing circuitry is also in the rideshare dispenser 1020f, but is occluded from view by the rideshare payload 1040 in one embodiment or part of the rideshare payload 1040 itself in an alternative embodiment.

Payloads 1040, 1060, 1070 are mounted on the dispensers 1020f, 1020e using attachment/deployment mechanisms that safety hold APLs to the dispenser and safely eject the smallsats from the dispenser. The pegboard panel design allows for an open architecture to allow for many different methods of attachment/deployment, to include Marmon clamp bands, rails, the Planetary Systems Corporation "Tabs" system, motorized light band, etc.

Figure 11:
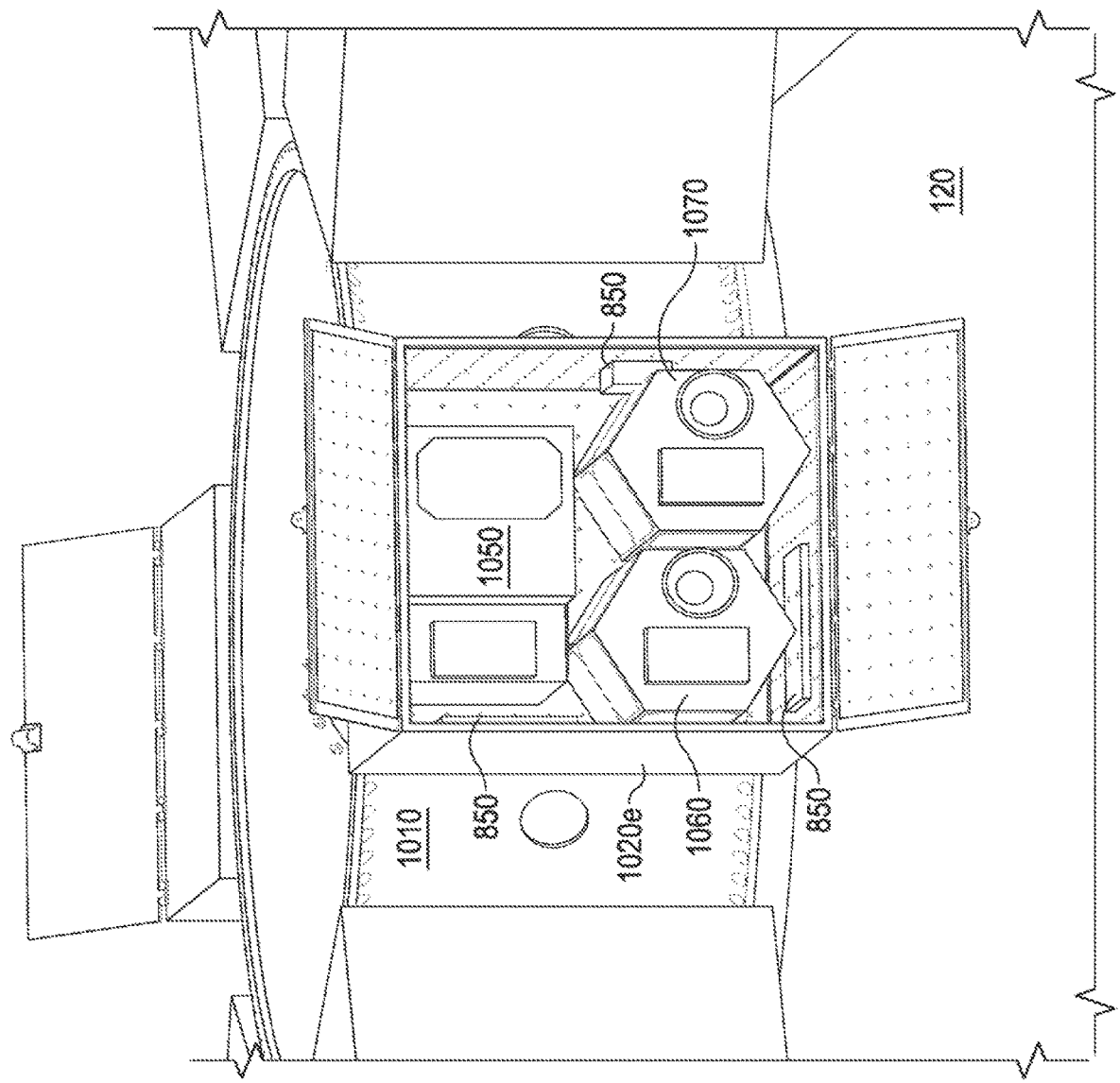
FIG. 11 is an isometric view of the adapter and rideshare dispensers of FIG. 10 in which one of the rideshare dispensers is open and occupied by one or more rideshare payloads and signal processing circuitry.

FIG. 11 is an isometric view of the adapter ring and rideshare dispensers of FIG. 10 in which one of the rideshare dispensers, namely the rideshare dispenser 1020e, is open and occupied by one or more rideshare payloads 1060, 1070 and signal processing circuitry 1050. FIG. 11 affords a closer view of the example rideshare payloads 1060, 1070 and the example signal processing circuitry 1050. Also depicted are ballast mass objects 850 used to tune the mass of the dispenser. Though unreferenced, the rideshare payloads 1060, 1070 are illustrated as including solar panels, antennas and nozzles for providing thrust to the rideshare payloads 1060, 1070.

As stated above, the example signal processing circuitry 1050 is operable to receive a separation signal from the LV and provide power and deployment sequencing for the rideshare payloads, among other things. For example, should any of the rideshare payloads require power at different voltages, frequencies or phase numbers, the signal processing circuitry 1050 is operable to convert the power to what the rideshare payload with which it is associated requires. As a further example, when the LV provides a standard signal, the signal processing circuitry 1050 would provide subsequent APL signals such as a rideshare payload powerup signal, a rideshare payload powerdown signal, a rideshare payload reset signal and a rideshare payload deploy signal. It is possible under mission-unique circumstances that APLs may need other standard signals from the LV. In this rare occasion, the signal processing circuitry 1050 is operable to respond to LV signals by providing sequences of payload-specific signals to the rideshare payload(s) with which it is associated to accomplish the desired function. For instance, if the LV provides a rideshare payload deploy signal, the signal processing circuitry 1050 is operable to provide deployment sequencing, which may include opening rideshare dispenser doors, waiting for desired deployment conditions, decoupling the rideshare payload(s) from the rideshare dispenser, activating thrusters, closing the rideshare dispenser doors or taking such other steps necessary to deploy a rideshare payload.

Figure 12:
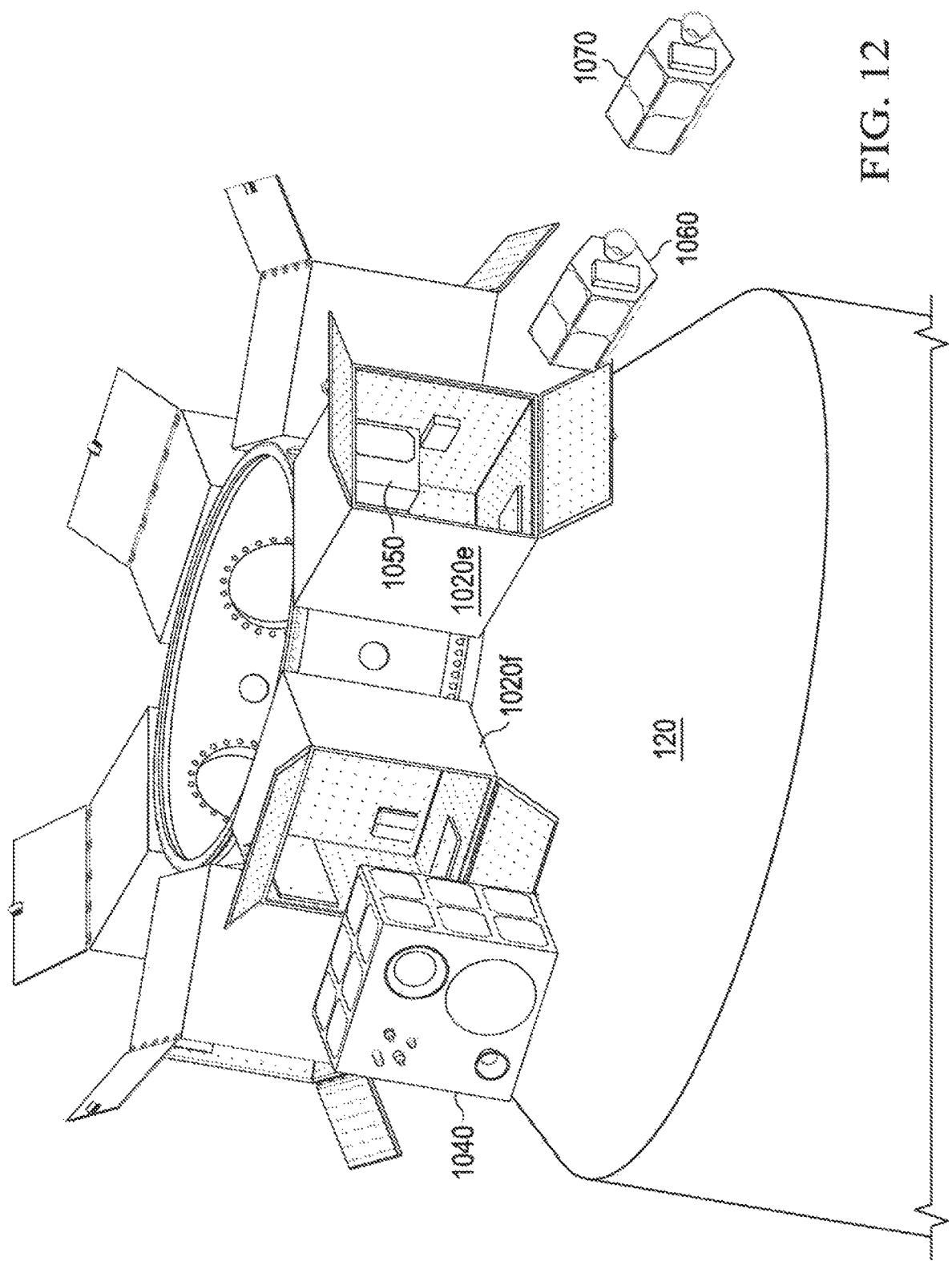
FIG. 12 is an isometric view of the adapter and rideshare dispensers of FIG. 10 from which rideshare payloads are being deployed.

FIG. 12 is an isometric view of the adapter ring and rideshare dispensers of FIG. 10 from which the rideshare payloads 1040, 1060, 1070 are being deployed. FIG. 12 shows the signal processing circuitry 1050 remaining within the rideshare dispenser 1020e. In the embodiment of FIG. 12, the rideshare payloads 1040, 1060, 1070 appear to be deploying concurrently. However, the rideshare payloads 1040, 1060, 1070 need not deploy concurrently or in any particular order.

Figure 13:
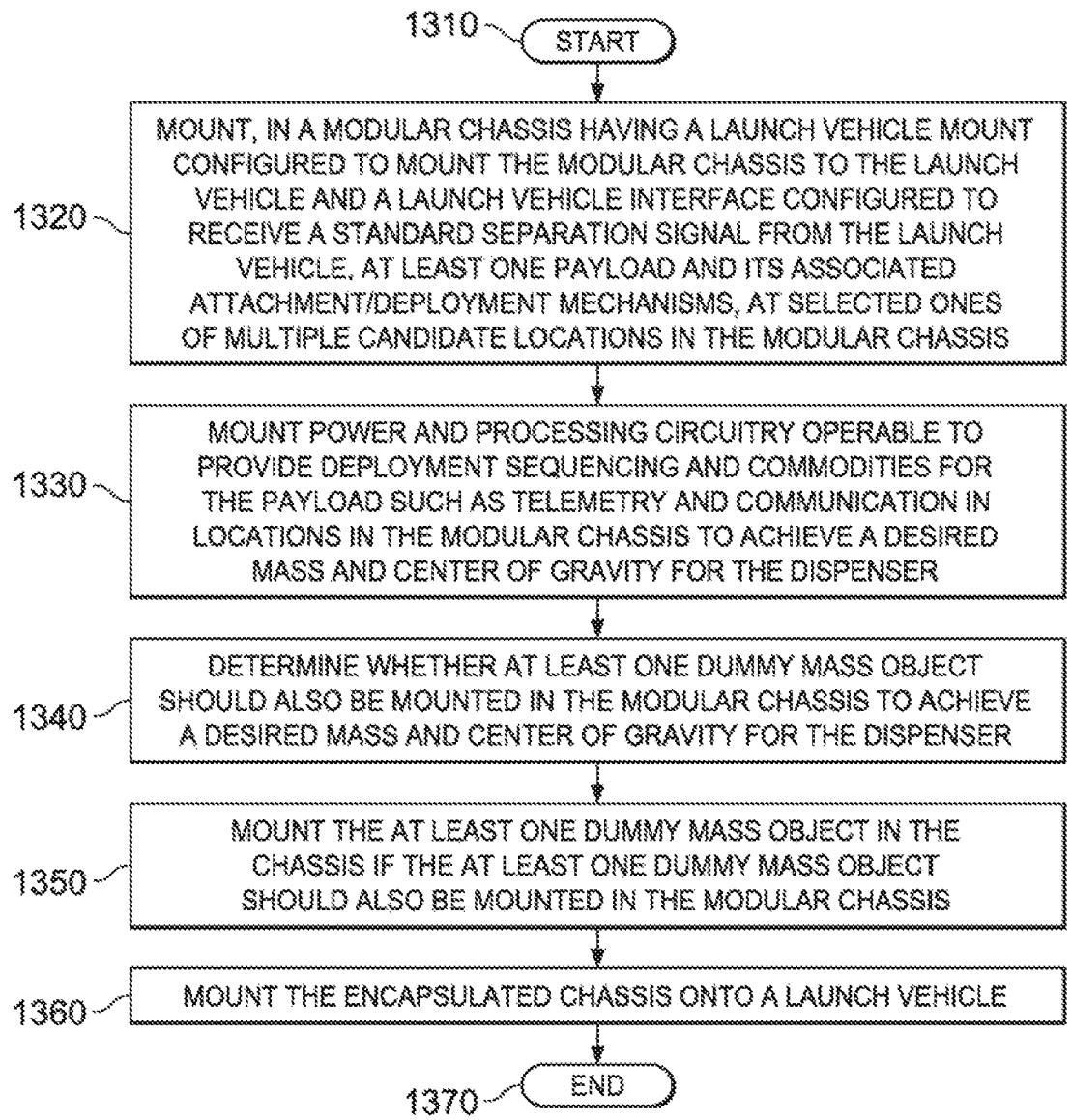
FIG. 13 is a flow diagram of one embodiment of a method of operating a configurable-mass rideshare dispenser carried out according to the principles of the invention.

FIG. 13 is a flow diagram of one embodiment of a method of operating a configurable-mass rideshare dispenser carried out according to the principles of the invention. The method involves a modular chassis having an LV mount configured to mount the modular chassis to the LV and an LV interface configured to receive a separation signal from the LV and begins in a start step 1310. In a step 1320, at least one rideshare payload and its associated attachment/deployment mechanisms are mounted at selected ones of multiple candidate locations in the modular chassis. In a step 1330, payload signal processing circuitry operable to provide deployment sequencing and commodities for the rideshare payload such as telemetry and communications are mounted in the modular chassis to achieve a desired mass and center of gravity for the dispenser. In a step 1340, it is determined whether at least one additional mass object should also be mounted in the modular chassis to achieve a desired mass and center of gravity for the dispenser. In a step 1350, the at least one additional mass object is mounted in the chassis if the at least one additional mass object should also be mounted in the modular chassis. In a step 1360, the rideshare chassis is mounted onto a launch vehicle. The method ends in an end step 1370.

Those skilled in the art to which this application relates will appreciate that other and further additions, deletions, substitutions and modifications may be made to the described embodiments.

What is claimed is:

1. A method of operating a configurable-mass rideshare dispenser for a launch vehicle (LV), comprising:

mounting, in a modular chassis having an LV mount configured to mount said modular chassis to said LV and an LV interface configured to receive a separation signal from said LV, a rideshare payload at a selected one of multiple candidate locations in said modular chassis;

mounting payload signal processing circuitry operable to provide deployment sequencing for said rideshare payload at another selected one of said multiple candidate locations in said modular chassis;

determining whether at least one additional mass object should also be mounted in said modular chassis to achieve a desired mass and center of gravity for said dispenser; and mounting said at least one additional mass object in said modular chassis if said at least one additional mass object should also be mounted in said modular chassis; and mounting said modular chassis onto a launch vehicle.

2. The method as recited in claim 1 wherein a pegboard panel associated with a wall of said rideshare dispenser provides at least some of said multiple internal mounts, said mounting comprising mounting said at least one additional mass object onto said pegboard panel and said wall if said at least one additional mass object should also be mounted.

3. The method as recited in claim 2 wherein said pegboard panel has a feature configured to resist movement by a additional mass object fastened on a pegboard panel.

4. The method as recited in claim 1 further comprising a plurality of pegboard panels associated with a corresponding plurality of walls of said rideshare dispenser, said additional mass retainers cooperable to allow at least one of:

a mass of said rideshare dispenser to be increased, and a center of gravity of said rideshare dispenser to be moved, said mounting comprising mounting said at least one additional mass object fastened on said pegboard panel and a corresponding one of said plurality of walls if said at least one additional mass object should also be mounted.

5. The method as recited in claim 1 wherein said chassis has at least one door.

6. The method as recited in claim 1 wherein said modular chassis is cubic.

7. The method as recited in claim 1 wherein said signal processing circuitry is further operable to convert power to meet requirements of rideshare payloads.

\* \* \* \* \*